United States Patent
Metayer

(10) Patent No.: US 10,072,716 B2
(45) Date of Patent: Sep. 11, 2018

(54) METHOD AND DEVICE FOR CAPTURING PARTICLES EJECTED BY THE FRICTION BRAKING ELEMENTS OF A DISK BRAKE SYSTEM

(71) Applicants: CONTINENTAL AUTOMOTIVE FRANCE, Toulouse (FR); CONTINENTAL AUTOMOTIVE GmbH, Hannover (DE)

(72) Inventor: Olivier Metayer, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 17 days.

(21) Appl. No.: 15/441,509

(22) Filed: Feb. 24, 2017

(65) Prior Publication Data

US 2017/0248180 A1 Aug. 31, 2017

(30) Foreign Application Priority Data

Feb. 25, 2016 (FR) ...................................... 16 51546

(51) Int. Cl.
*F16D 65/00* (2006.01)
*B01D 46/10* (2006.01)
(Continued)

(52) U.S. Cl.
CPC ......... *F16D 65/0031* (2013.01); *B01D 46/10* (2013.01); *F16D 55/22* (2013.01);
(Continued)

(58) Field of Classification Search
CPC ............. F16D 65/0031; F16D 65/0081; F16D 65/847; F16D 2065/783; B01D 46/10; B01D 2279/40
(Continued)

(56) References Cited

U.S. PATENT DOCUMENTS 6,592,642 B2* 7/2003 Maricq .................... F16D 65/00
188/218 A
7,094,268 B2* 8/2006 Krantz ............... B01D 53/0407
123/198 E
(Continued)

FOREIGN PATENT DOCUMENTS

CN       1 626 388 A    6/2005
CN    20 33 74707 U    1/2014
(Continued)

OTHER PUBLICATIONS

FR Search Report, dated Oct. 25, 2016, from corresponding FR application.

*Primary Examiner* — Thomas W Irvin
(74) *Attorney, Agent, or Firm* — Young & Thompson

(57) ABSTRACT

Disclosed is a method for capturing particles ejected by friction braking elements (2) of a braking system (1, 2) with disk brakes (1) of a vehicle. The braking system is equipped with a capture conduit (3) taking a form adapted to accommodate the friction braking elements (2) and to conduct, while the vehicle is moving, an air flow for cooling the friction braking elements, the conduit integrating a shutter (6) with a plate (6*a*) positioned upstream of the friction braking elements (2), and a unit (5) for capturing particles ejected by the friction braking elements (2). Furthermore, the shutter (6) is controlled so as to move the plate (6*a*) between a position of closing the conduit (3), set for vehicle travel speeds lower than a predefined threshold speed Vs, and at least one position of at least partially opening the conduit (3), for vehicle travel speeds higher than the threshold speed Vs.

14 Claims, 1 Drawing Sheet

(51) Int. Cl.
*F16D 65/847* (2006.01)
*F16D 55/22* (2006.01)
*F16D 65/78* (2006.01)

(52) U.S. Cl.
CPC ........ *F16D 65/847* (2013.01); *B01D 2279/40* (2013.01); *F16D 2065/783* (2013.01)

(58) Field of Classification Search
USPC ........................... 188/218 A, 264 A, 264 AA
See application file for complete search history.

(56) References Cited

U.S. PATENT DOCUMENTS

| | | | | |
|---|---|---|---|---|
| 7,111,710 | B2 * | 9/2006 | O'Rourke | F16D 65/0037 188/218 XL |
| 7,833,302 | B2 * | 11/2010 | Krantz | B01D 53/0407 188/218 A |
| 8,025,132 | B2 * | 9/2011 | Krantz | B60L 11/123 188/218 A |
| 8,167,098 | B2 * | 5/2012 | Jessberger | B60T 17/221 188/264 A |
| 8,191,691 | B2 * | 6/2012 | Gelb | F16D 65/847 188/264 AA |
| 8,701,844 | B2 * | 4/2014 | Tsiberidis | F16D 65/847 188/218 A |
| 9,097,301 | B2 * | 8/2015 | Pahle | F16D 65/0031 |
| 9,677,627 | B2 * | 6/2017 | Kunzler | F16D 65/0031 |
| 9,726,241 | B2 * | 8/2017 | Rocca-Serra | F16D 65/0031 |
| 9,885,396 | B2 * | 2/2018 | Kunzler | F16D 65/0081 |
| 2005/0126868 | A1 | 6/2005 | Lee | |
| 2008/0257666 | A1 | 10/2008 | Gelb | |
| 2009/0265880 | A1 | 10/2009 | Jessberger | |
| 2010/0096226 | A1 | 4/2010 | Gelb | |
| 2010/0236880 | A1 | 9/2010 | Martinesz | |
| 2011/0214568 | A1 | 9/2011 | Krantz | |
| 2014/0054121 | A1 * | 2/2014 | Hummel | F16D 65/0031 188/218 A |
| 2014/0076673 | A1 | 3/2014 | Tsiberidis | |
| 2015/0122601 | A1 * | 5/2015 | Rocca-Serra | F16D 65/0031 188/218 A |
| 2015/0233436 | A1 * | 8/2015 | Rocca-Serra | F16D 65/0031 188/264 R |

FOREIGN PATENT DOCUMENTS

| | | |
|---|---|---|
| CN | 20 34 72824 U | 3/2014 |
| DE | 20 2005 017472 U1 | 5/2006 |
| DE | 10 2008 029 504 A1 | 12/2009 |
| DE | 10 20120022 886 A1 | 10/2013 |
| DE | 10 2013 215251 A1 | 5/2014 |
| JP | 2011 220372 A | 11/2011 |
| JP | 2012/081931 A | 4/2012 |
| WO | 2012/076476 A1 | 6/2012 |

* cited by examiner

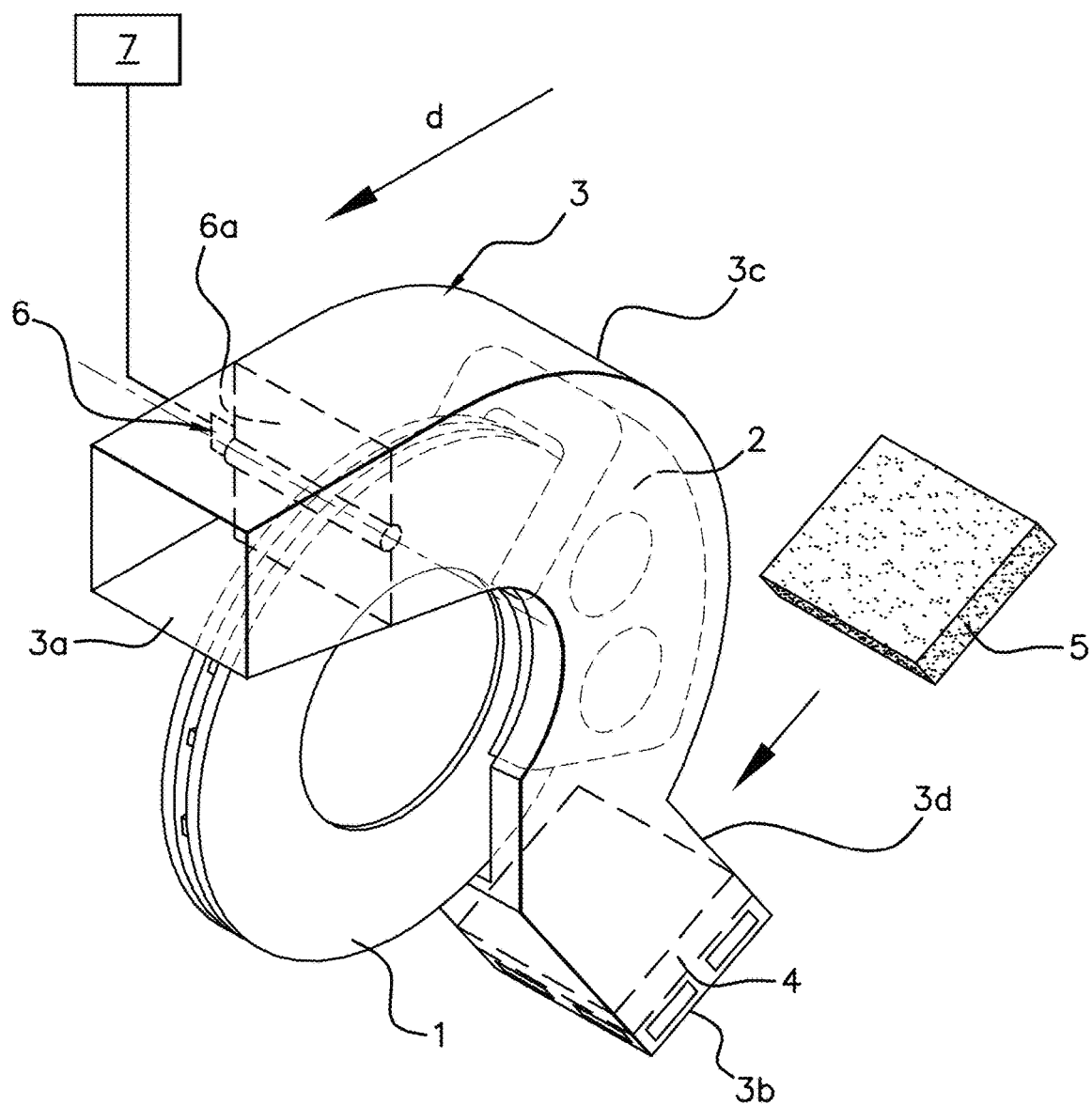

METHOD AND DEVICE FOR CAPTURING PARTICLES EJECTED BY THE FRICTION BRAKING ELEMENTS OF A DISK BRAKE SYSTEM

FIELD OF THE INVENTION

The invention concerns a method for capturing particles ejected by the friction braking elements of a disk brake system of a vehicle. It includes a capture device for implementation of this capture method.

BACKGROUND OF THE INVENTION

According to recent studies, wear of disk brake pads currently accounts for around 20% of the particles emitted by road traffic. During a braking action, the friction between the pads and the disks causes the ejection of a quantity of fine particles which are at least as hazardous and toxic, in particular for human health, as the particles emitted by exhaust systems.

Furthermore, these particles are emitted by all types of vehicles (cars, trucks, buses, metro trains, trains, trams etc.) irrespective of their propulsion method (petrol or diesel engines, or electric).

Despite this finding, at present there are no technical solutions likely to lead, reliably and for an acceptable implementation cost, to a significant limitation of the amount of particles emitted by these friction braking elements of disk brake systems.

SUMMARY OF THE INVENTION

The present invention aims to remedy this defect, and its main objective is to provide a reliable capture method and device leading to a significant limitation of the amount of particles emitted by the friction braking elements of disk brake systems, for a relatively low implementation cost.

To this end, the invention concerns a method for capturing particles ejected by the friction braking elements of a disk brake system of a vehicle, comprising:
  equipping said braking system with a capture conduit:
    provided with an upstream air inlet face and a downstream air outlet face and having a form adapted to accommodate the friction braking elements, and to conduct, when the vehicle is moving, an air flow for cooling said friction braking elements between the upstream face and the downstream face,
    integrating a shutter with a plate positioned between the upstream face and the friction braking elements,
    integrating means for capturing particles ejected by the friction braking elements,
  controlling the shutter so as to move the plate between a position for closing the conduit, set for vehicle travel speeds lower than a predefined threshold speed Vs, and at least one position for at least partially opening the conduit, for vehicle travel speeds higher than the threshold speed Vs.

Firstly, the originality and efficacy of the method according to the invention lie in the use of the dynamic air flow of the vehicle in order to generate, inside a single capture conduit, an air flow ensuring cooling of the braking system and transport towards the capture means of the particles ejected by the friction braking elements.

Furthermore, this originality and efficacy also result from the presence of a shutter which is controlled in particular such that the plate closes the capture conduit under travel conditions (low speed or stationary vehicle) during which, due to the absence of air flow, particles are liable to escape from the conduit through its upstream face.

It should also be noted that, in particular concerning public transport vehicles such as buses, metro trains etc., the plate closes during phases of approaching a station and stoppage of the vehicle, i.e. in zones with a high density of users.

In addition to its efficacy and reliability, this capture method has the advantage of requiring, for its implementation, a single conduit fitted with a shutter and capture means, and a connection of the shutter to an on-board computer which is conventionally fitted to the vehicle and adapted in particular to read the speed of said vehicle.

According to an advantageous embodiment of the invention, when the vehicle is traveling at speeds higher than the threshold speed Vs and lower than a predefined ceiling speed Vp, the shutter is controlled so as to move the plate into a position of maximum opening for said ceiling speed Vp of vehicle travel, and into positions of partial opening, which determine variations in the cooling air flow proportional to the variations in vehicle speed, for vehicle travel speeds between the threshold speed Vs and the ceiling speed Vp.

Furthermore, for vehicle travel speeds higher than the ceiling speed Vp, advantageously according to the invention, the shutter is controlled so as to move the plate into a predefined position of partial opening of the conduit.

This feature leads to a reduction, in the capture conduit, above a predefined ceiling speed Vp, of turbulence liable to disrupt the capture of particles.

Also, when the vehicle is traveling at speeds higher than the threshold speed Vs and lower than the ceiling speed Vp, advantageously according to the invention, the shutter is controlled so as to move the plate into a position of maximum opening during at least a deceleration $\Delta V/\Delta T$ greater than a predefined threshold.

This control phase promotes the creation of a great cooling air flow which, during strong deceleration resulting from hard braking, meets the thermal needs of braking and provides an increased conduction of ejected particles.

According to another advantageous embodiment of the invention, the conduit integrates capture means composed of filtration elements of dimensions matching the section of said conduit, arranged between the friction braking elements and the upstream face.

Furthermore, the filtration elements, advantageously according to the invention, take the form of a removable and interchangeable cassette.

The invention extends to a capture device comprising:
  a capture conduit provided with an upstream air inlet face and a downstream air outlet face and having a form adapted to accommodate the friction braking elements, and to conduct an air flow for cooling said friction braking elements between the upstream face and the downstream face, said conduit integrating:
    a shutter with a plate adapted to be positioned between the upstream face and the friction braking elements,
    means for capturing particles ejected by the friction braking elements,
  a control unit for the shutter, programmed to move the plate between a position for closing the conduit, set for vehicle travel speeds lower than a predefined threshold speed Vs, and at least one position for at least partially opening the conduit, for vehicle travel speeds higher than the threshold speed Vs.

BRIEF DESCRIPTION OF THE DRAWINGS

Further characteristics, aims and advantages of the invention will arise from the detailed description below with reference to the attached drawing which shows, as a non-limitative example, a preferred embodiment. On the drawing:

the only FIG. 1 is a diagrammatic perspective view of a capture device according to the invention fitted to a disk brake system.

DETAILED DESCRIPTION OF THE INVENTION

The capture device according to the invention, shown in FIG. 1, is designed to capture particles ejected by the friction braking elements of a braking system of the type, shown in FIG. 1, comprising a disk 1 and a caliper 2, allowing movement of the pads or linings so as to bring them into contact with the disk 1.

(For the purposes of clarity and simplification of the description below, this capture device is considered to be mounted on a braking system fitted to a vehicle traveling forward in the direction "d" indicated on FIG. 1.)

This capture device comprises a capture conduit 3 of cross-section, for example rectangular, suitable for accommodating the caliper 2 and thus preventing the distribution of particles emitted by the pads or linings during braking phases of the vehicle.

This capture conduit 3 has the general form of a "question mark", and comprises firstly an inwardly curved portion 3c with a curvature matching that of the disk 1 and the caliper 2 and adapted to accommodate said caliper, this curved portion 3c being open to the external air via an end face 3a extending orthogonally relative to axis "d" and constituting the upstream air inlet face 3a of said conduit.

Opposite the upstream face 3a, the capture conduit 3 comprises a straight end portion 3d which opens to the external air via an end face 3b constituting the downstream air outlet face of said conduit.

This straight portion 3c also accommodates a slider system 4 for inserting into the capture conduit 3 a cassette 5 of planar dimensions matching those of said conduit, made of a material suitable for capturing the particles ejected by the pads or linings.

The capture conduit 3 also integrates a shutter 6 fitted with a plate 6a positioned between the upstream face 3a and the caliper 2, and controlled by an on-board computer 7 adapted in particular to read the speed of the vehicle.

This control of the shutter 6 comprises principally:
a/ for vehicle travel speeds lower than a predefined threshold speed Vs, including zero speed, activating the closure of the plate 6a,
b/ for vehicle travel speeds higher than the threshold speed Vs and lower than a predefined ceiling speed Vp, controlling the shutter 6 so as to move the plate 6a into a position of maximum opening for said ceiling speed Vp, and into positions of partial opening, which determine the variations in the cooling air flow proportional to the variations in the vehicle speed, for vehicle travel speeds between the threshold speed Vs and the ceiling speed Vp,
c/ for vehicle travel speeds higher than the ceiling speed Vp, controlling the shutter 6 so as to move the plate 6a into a predefined position of partial opening of the capture conduit 3 so as to reduce the turbulence liable to disrupt the capture of the particles.

Also, when b/ Vs<V<Vp, and during at least a deceleration $\Delta V/\Delta T$ greater than a predefined threshold, the shutter 6 is controlled so as to move the plate 6a in a position of maximum opening in order to meet the thermal needs of braking and ensure an increased conduction of emitted particles.

For example, the threshold speed Vs above which the plate 6a is closed is equal to 30 km/h, and the ceiling speed Vp is equal to 130 km/h.

The method and the capture device according to the invention described above lead to a significant limitation in the amount of particles emitted by the friction braking elements of disk brake systems for a relatively low implementation cost.

The invention claimed is:

1. Method for capturing particles ejected by the friction braking elements (2) of a braking system (1, 2) with brake discs (1) of a vehicle, comprising:
equipping said braking system (1, 2) with a capture conduit (3):
provided with an upstream air inlet face (3a) and a downstream air outlet face (3b) and having a form adapted to accommodate the friction braking elements (2), and to conduct, when the vehicle is moving, an air flow for cooling said friction braking elements between the upstream face (3a) and the downstream face (3b),
integrating a shutter (6) with a plate (6a) positioned between the upstream face (3a) and the friction braking elements (2),
integrating means (5) for capturing particles ejected by the friction braking elements (2),
controlling the shutter (6) so as to move the plate (6a) between a position for closing the conduit (3), set for vehicle travel speeds lower than a predefined threshold speed Vs, and at least one position for at least partially opening the conduit (3), for vehicle travel speeds higher than the threshold speed Vs.

2. Capture method according to claim 1, wherein when the vehicle is traveling at speeds higher than the threshold speed Vs and lower than a predefined ceiling speed Vp, the shutter (6) is controlled so as to move the plate (6a) into a position of maximum opening for said ceiling speed Vp of vehicle travel, and into positions of partial opening, which determine variations in the cooling air flow proportional to the variations in vehicle speed, for vehicle travel speeds between the threshold speed Vs and the ceiling speed Vp.

3. Capture method according to claim 2, wherein for vehicle travel speeds higher than the ceiling speed Vp, the shutter (6) is controlled so as to move the plate (6a) into a predefined position of partial opening of the conduit (3).

4. Capture method according to claim 3, wherein when the vehicle is traveling at speeds higher than the threshold speed Vs and lower than the ceiling speed Vp, the shutter (6) is controlled so as to move the plate (6a) into a position of maximum opening during at least a deceleration $\Delta V/\Delta T$ greater than a predefined threshold.

5. Capture method according to claim 4, wherein the conduit (3) integrates capture means composed of filtration elements (5) of dimensions matching the section of said conduit, arranged between the friction braking elements (2) and the upstream face (3b).

6. Capture method according to claim 3, wherein the conduit (3) integrates capture means composed of filtration elements (5) of dimensions matching the section of said conduit, arranged between the friction braking elements (2) and the upstream face (3b).

7. Capture method according to claim 2, wherein when the vehicle is traveling at speeds higher than the threshold speed Vs and lower than the ceiling speed Vp, the shutter (6)

is controlled so as to move the plate (6a) into a position of maximum opening during at least a deceleration $\Delta V/\Delta T$ greater than a predefined threshold.

8. Capture method according to claim 7, wherein the conduit (3) integrates capture means composed of filtration elements (5) of dimensions matching the section of said conduit, arranged between the friction braking elements (2) and the upstream face (3b).

9. Capture method according to claim 2, wherein the conduit (3) integrates capture means composed of filtration elements (5) of dimensions matching the section of said conduit, arranged between the friction braking elements (2) and the upstream face (3b).

10. Capture method according to claim 1, wherein the conduit (3) integrates capture means composed of filtration elements (5) of dimensions matching the section of said conduit, arranged between the friction braking elements (2) and the upstream face (3b).

11. Capture method according to claim 10, wherein the filtration elements take the form of a removable and interchangeable cassette (5).

12. Device for capturing particles ejected by the friction braking elements (2) of a braking system (1, 2) with brake discs (1) of a vehicle, comprising:
   a capture conduit (3) provided with an upstream air inlet face (3a) and a downstream air outlet face (3b) and having a form adapted to accommodate the friction braking elements (2), and to conduct an air flow for cooling said friction braking elements between the upstream face (3a) and the downstream face (3b), said conduit integrating:
      a shutter (6) with a plate (6a) adapted to be positioned between the upstream face (3a) and the friction braking elements (2),
      means (5) for capturing particles ejected by the friction braking elements (2),
   a control unit (7) for the shutter (6), programmed to move the plate (6a) between a position for closing the conduit (3), set for vehicle travel speeds lower than a predefined threshold speed Vs, and at least one position for at least partially opening the conduit (3), for vehicle travel speeds higher than the threshold speed Vs.

13. Capture device according to claim 12, wherein the capture means are composed of filtration elements (5) of dimensions matching the section of the conduit, adapted to be arranged between the friction braking elements (2) and the upstream face (3b).

14. Capture device according to claim 13, wherein the filtration elements
   consist of a removable and interchangeable cassette (5).

\* \* \* \* \*